US012255781B2

(12) United States Patent
Liu et al.

(10) Patent No.: US 12,255,781 B2
(45) Date of Patent: Mar. 18, 2025

(54) NETWORK MANAGEMENT

(71) Applicant: Nokia Solutions and Networks Oy, Espoo (FI)

(72) Inventors: Qiang Liu, Charlotte, NC (US); Nak Jung Choi, Florham Park, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 251 days.

(21) Appl. No.: 17/692,275

(22) Filed: Mar. 11, 2022

(65) Prior Publication Data

US 2022/0303191 A1    Sep. 22, 2022

Related U.S. Application Data

(60) Provisional application No. 63/162,766, filed on Mar. 18, 2021.

(51) Int. Cl.
*H04L 41/0894* (2022.01)
*H04L 41/0826* (2022.01)

(52) U.S. Cl.
CPC ...... *H04L 41/0894* (2022.05); *H04L 41/0826* (2013.01)

(58) Field of Classification Search
CPC . H04L 41/08; H04L 41/0803; H04L 41/0823; H04L 41/0826; H04L 41/0894; H04L 41/16
See application file for complete search history.

(56) References Cited

U.S. PATENT DOCUMENTS 8,774,119 B2    7/2014  Chakrabarti et al.
9,179,363 B2   11/2015  Siomina
(Continued)

FOREIGN PATENT DOCUMENTS

CN    106954267 B    7/2017
WO    2021/069196 A1  4/2021
(Continued)

OTHER PUBLICATIONS

Bertino, E., et al., "A Cognitive Policy Framework for Next-Generation Distributed Federated Systems," Proceedings of the International Conference on Distributed Computing Systems, IEEE Computer Society, Jun. 5, 2017, pp. 1876-1886.
(Continued)

*Primary Examiner* — Atta Khan
*Assistant Examiner* — William C McBeth
(74) *Attorney, Agent, or Firm* — Tong, Rea, Bentley & Kim, LLC

(57) ABSTRACT

Various example embodiments for supporting communication network management may be configured to support communication network management based on various policies which may include one or more static rule-based policies (e.g., a rule-based resource management policy) and one or more machine learning (ML) based policies (e.g., an ML-based resource management policy). Various example embodiments for supporting communication network management may be configured to support communication network management based on evaluation and selection of policies to be applied for supporting communication network management. Various example embodiments for supporting communication network management may be configured to support communication network management based on regulation of network management actions generated based on selected policies before application of the network management actions to the communication network. Various example embodiments may be configured to dynamically switch between use of static rule-based resource management policies and use of ML-based resource management policies in a risk-controlled manner.

19 Claims, 9 Drawing Sheets

(56) References Cited

U.S. PATENT DOCUMENTS

| | | |
|---|---|---|
| 9,854,597 B2 | 12/2017 | Chen |
| 10,122,757 B1 | 11/2018 | Kruse et al. |
| 2009/0254638 A1* | 10/2009 | Spatscheck ............. H04L 41/08 709/220 |
| 2018/0287902 A1 | 10/2018 | Chitalia et al. |
| 2019/0132422 A1* | 5/2019 | Garcia Duran ......... H04L 41/16 |
| 2019/0228309 A1* | 7/2019 | Yu ........................... G06N 20/00 |
| 2019/0258938 A1* | 8/2019 | Mnih ...................... G06N 20/00 |
| 2019/0317814 A1* | 10/2019 | Jin .......................... G06N 20/00 |
| 2019/0361854 A1* | 11/2019 | Rogynskyy ........... H04L 41/082 |
| 2020/0106744 A1 | 4/2020 | Miriyala et al. |
| 2021/0152439 A1* | 5/2021 | Soulhi ..................... H04L 41/16 |
| 2021/0326662 A1 | 10/2021 | Mwanje et al. |
| 2021/0392047 A1* | 12/2021 | Jamkhedkar ........ H04L 41/0894 |
| 2021/0397941 A1* | 12/2021 | Zhu .......................... G06N 3/08 |
| 2023/0083063 A1* | 3/2023 | Badrinath ........... H04L 41/0894 709/223 |
| 2023/0254214 A1* | 8/2023 | Suzuki ................... H04L 41/16 709/223 |

FOREIGN PATENT DOCUMENTS

| | | | | |
|---|---|---|---|---|
| WO | WO 2021/165976 A1 | * | 8/2021 | ......... H04L 41/0894 |
| WO | WO 2022/199792 A1 | * | 9/2022 | ............. G06N 20/00 |

OTHER PUBLICATIONS

Extended European Search Report in corresponding EP Application No. 22162478.6, mailed on Jun. 28, 2022, 10 pages.

Office Action, Application No. CN 202210269079.2, Oct. 31, 2023, 5 pages.

Communication under Rule 71(3) EPC, Application No. EP 22162478. 6-1216, Jan. 9, 2024, 47 pages.

Garcia et al., "Safe Exploration of State and Action Spaces in Reinforcement Learning," Journal of Artificial Intelligence Research 45, Dec. 2012, 50 pages.

* cited by examiner

NETWORK MANAGEMENT

CROSS-REFERENCE TO RELATED APPLICATIONS

This application claims the benefit of U.S. Provisional Patent Application Ser. No. 63/162,766, filed on Mar. 18, 2021, which is hereby incorporated herein by reference in its entirety.

TECHNICAL FIELD

Various example embodiments relate generally to communication systems and, more particularly but not exclusively, to network management in communication systems.

BACKGROUND

Various communication networks may support various types of communications. As communication networks scale to meet increasing demands of various types of communications, management of such communication networks may be adapted to ensure that the communication networks continue to reliably and efficiently handle such communications.

SUMMARY

In at least some example embodiments, an apparatus includes at least one processor and at least one memory including computer program code, wherein the at least one memory and the computer program code are configured to, with the at least one processor, cause the apparatus to at least identify, for a communication network, a set of policies including a rule-based resource management policy and a machine learning based resource management policy, determine, for each policy in the set of policies based on a network state of the communication network, a respective set of policy evaluation parameters indicative of a risk of applying the respective policy to the communication network, select, from the set of policies based on a cumulative cost of the communication network and the respective sets of policy evaluation parameters for the respective policies, a selected policy for performing resource management for the communication network, generate, based on the selected policy, a resource management action for the communication network, revise, based on the network state and a resource usage of the communication network, the resource management action to form a revised resource management action for the communication network, and initiate execution of the revised resource management action for the communication network. In at least some example embodiments, for at least one of the policies, the respective set of policy evaluation parameters for the respective policy includes at least one reward parameter and at least one cost parameter. In at least some example embodiments, the at least one reward parameter is indicative of a resource utilization within the communication network based on use of the respective policy for resource management, and the at least one cost is indicative an extent of violation of service level agreements based on use of the respective policy for resource management. In at least some example embodiments, the at least one reward parameter includes a mean of an expected cumulative reward based on use of the respective policy for resource management and a deviation of an expected cumulative reward based on use of the respective policy for resource management, and the at least one cost parameter includes a mean of an expected cumulative cost based on use of the respective policy for resource management and a deviation of an expected cumulative cost based on use of the respective policy for resource management. In at least some example embodiments, for at least one of the policies, the respective set of policy evaluation parameters for the respective policy is determined based on a pair of regression models including a first regression model configured to estimate, based on the network state, a mean reward parameter and a mean cost parameter, and a second regression model configured to estimate, based on the network state, a deviation of reward parameter and a deviation of cost parameter. In at least some example embodiments, for at least one of the policies, the respective set of policy evaluation parameters for the respective policy is determined based on a neural network architecture. In at least some example embodiments, the neural network architecture is trained based on a stochastic gradient descent based method under a dataset including at least one of an experienced network state, an instantaneous reward, an instantaneous cost, or a next network state. In at least some example embodiments, the neural network architecture is configured to reduce or minimize differences between an estimated distribution of rewards and costs and a real distribution of rewards and costs. In at least some example embodiments, to select the selected policy, the at least one memory and the computer program code are configured to, with the at least one processor, cause the apparatus to at least select, from a set of available policy selection functions based on a determination as to whether the cumulative cost satisfies a threshold, a selected policy selection function and select, based on analysis of each of the sets of policy evaluation parameters based on the selected policy selection function, the selected policy. In at least some example embodiments, the threshold includes a cost based on service level agreements (SLAs) of users of the communication network. In at least some example embodiments, based on a determination that the cumulative cost is less than or equal to the threshold, the selected policy selection function is configured to prevent selection of a high-reward high-cost policy. In at least some example embodiments, the selected policy selection function includes $H_i = (r_m - \alpha \cdot r_v)/(c_m + \alpha \cdot c_v)$, wherein $r_m$ is a mean reward, $r_v$ is a deviation of reward, $c_m$ is a mean cost, $c_v$ is a deviation of cost, and $\alpha$ is a parameter indicative of a risk tolerance. In at least some example embodiments, based on a determination that the cumulative cost is equal to or greater than the threshold, the selected policy selection function is configured to select a policy having a lowest expected cost. In at least some example embodiments, the selected policy selection function includes $G_i = c_m + \alpha \cdot c_v$, wherein $c_m$ is a mean cost, $c_v$ is a deviation of cost, and $\alpha$ is a parameter indicative of a risk tolerance. In at least some example embodiments, to revise the resource management action to form the revised resource management action, the at least one memory and the computer program code are configured to, with the at least one processor, cause the apparatus to at least revise the resource management action, to form the revised resource management action, based on use of a neural network. In at least some example embodiments, the neural network is configured to minimize an objective that is based on violation function related to violation of an instantaneous constraint of the communication network. In at least some example embodiments, to revise the resource management action to form the revised resource management action, the at least one memory and the computer program code are configured to, with the at least one processor, cause the apparatus to at least revise the resource management action, to form the revised resource management action, while reducing a possibility of violating an instantaneous constraint of the communication network and maintaining an expected instantaneous cost for resource management action. In at least some example embodiments, to revise the resource management action to form the revised resource management action, the at least one memory and the computer program code are configured to, with the at least one processor, cause the apparatus to at least reduce at least one element of the resource management action based on a resource usage of the communication network. In at least some example embodiments, the at least one memory and the computer program code are configured to, with the at least one processor, cause the apparatus to at least receive, from the communication network based on the execution of the revised resource management action for the communication network, network state information and revise the machine learning based resource management policy based on the network state information.

In at least some example embodiments, a non-transitory computer-readable medium stores computer program code configured to cause an apparatus to identify, for a communication network, a set of policies including a rule-based resource management policy and a machine learning based resource management policy, determine, for each policy in the set of policies based on a network state of the communication network, a respective set of policy evaluation parameters indicative of a risk of applying the respective policy to the communication network, select, from the set of policies based on a cumulative cost of the communication network and the respective sets of policy evaluation parameters for the respective policies, a selected policy for performing resource management for the communication network, generate, based on the selected policy, a resource management action for the communication network, revise, based on the network state and a resource usage of the communication network, the resource management action to form a revised resource management action for the communication network, and initiate execution of the revised resource management action for the communication network. In at least some example embodiments, for at least one of the policies, the respective set of policy evaluation parameters for the respective policy includes at least one reward parameter and at least one cost parameter. In at least some example embodiments, the at least one reward parameter is indicative of a resource utilization within the communication network based on use of the respective policy for resource management, and the at least one cost is indicative an extent of violation of service level agreements based on use of the respective policy for resource management. In at least some example embodiments, the at least one reward parameter includes a mean of an expected cumulative reward based on use of the respective policy for resource management and a deviation of an expected cumulative reward based on use of the respective policy for resource management, and the at least one cost parameter includes a mean of an expected cumulative cost based on use of the respective policy for resource management and a deviation of an expected cumulative cost based on use of the respective policy for resource management. In at least some example embodiments, for at least one of the policies, the respective set of policy evaluation parameters for the respective policy is determined based on a pair of regression models including a first regression model configured to estimate, based on the network state, a mean reward parameter and a mean cost parameter, and a second regression model configured to estimate, based on the network state, a deviation of reward parameter and a deviation of cost parameter. In at least some example embodiments, for at least one of the policies, the respective set of policy evaluation parameters for the respective policy is determined based on a neural network architecture. In at least some example embodiments, the neural network architecture is trained based on a stochastic gradient descent based method under a dataset including at least one of an experienced network state, an instantaneous reward, an instantaneous cost, or a next network state. In at least some example embodiments, the neural network architecture is configured to reduce or minimize differences between an estimated distribution of rewards and costs and a real distribution of rewards and costs. In at least some example embodiments, to select the selected policy, the computer program code is configured to cause the apparatus to at least select, from a set of available policy selection functions based on a determination as to whether the cumulative cost satisfies a threshold, a selected policy selection function and select, based on analysis of each of the sets of policy evaluation parameters based on the selected policy selection function, the selected policy. In at least some example embodiments, the threshold includes a cost based on service level agreements (SLAs) of users of the communication network. In at least some example embodiments, based on a determination that the cumulative cost is less than or equal to the threshold, the selected policy selection function is configured to prevent selection of a high-reward high-cost policy. In at least some example embodiments, the selected policy selection function includes $H_i=(r_m-\alpha \cdot r_v)/(c_m+\alpha \cdot c_v)$, wherein $r_m$ is a mean reward, $r_v$ is a deviation of reward, $c_m$ is a mean cost, $c_v$ is a deviation of cost, and $\alpha$ is a parameter indicative of a risk tolerance. In at least some example embodiments, based on a determination that the cumulative cost is equal to or greater than the threshold, the selected policy selection function is configured to select a policy having a lowest expected cost. In at least some example embodiments, the selected policy selection function includes $G_i=c_m+\alpha \cdot c_v$, wherein $c_m$ is a mean cost, $c_v$ is a deviation of cost, and $\alpha$ is a parameter indicative of a risk tolerance. In at least some example embodiments, to revise the resource management action to form the revised resource management action, the computer program code is configured to cause the apparatus to at least revise the resource management action, to form the revised resource management action, based on use of a neural network. In at least some example embodiments, the neural network is configured to minimize an objective that is based on violation function related to violation of an instantaneous constraint of the communication network. In at least some example embodiments, to revise the resource management action to form the revised resource management action, the computer program code is configured to cause the apparatus to at least revise the resource management action, to form the revised resource management action, while reducing a possibility of violating an instantaneous constraint of the communication network and maintaining an expected instantaneous cost for resource management action. In at least some example embodiments, to revise the resource management action to form the revised resource management action, the computer program code is configured to cause the apparatus to at least reduce at least one element of the resource management action based on a resource usage of the communication network. In at least some example embodiments, the computer program code is configured to cause the apparatus to at least receive, from the communication network based on the execution of the revised resource management action for the communication network, network state information and revise the machine learning based resource management policy based on the network state information.

In at least some example embodiments, a method includes identifying, for a communication network, a set of policies including a rule-based resource management policy and a machine learning based resource management policy, determining, for each policy in the set of policies based on a network state of the communication network, a respective set of policy evaluation parameters indicative of a risk of applying the respective policy to the communication network, selecting, from the set of policies based on a cumulative cost of the communication network and the respective sets of policy evaluation parameters for the respective policies, a selected policy for performing resource management for the communication network, generating, based on the selected policy, a resource management action for the communication network, revising, based on the network state and a resource usage of the communication network, the resource management action to form a revised resource management action for the communication network, and initiating execution of the revised resource management action for the communication network. In at least some example embodiments, for at least one of the policies, the respective set of policy evaluation parameters for the respective policy includes at least one reward parameter and at least one cost parameter. In at least some example embodiments, the at least one reward parameter is indicative of a resource utilization within the communication network based on use of the respective policy for resource management, and the at least one cost is indicative an extent of violation of service level agreements based on use of the respective policy for resource management. In at least some example embodiments, the at least one reward parameter includes a mean of an expected cumulative reward based on use of the respective policy for resource management and a deviation of an expected cumulative reward based on use of the respective policy for resource management, and the at least one cost parameter includes a mean of an expected cumulative cost based on use of the respective policy for resource management and a deviation of an expected cumulative cost based on use of the respective policy for resource management. In at least some example embodiments, for at least one of the policies, the respective set of policy evaluation parameters for the respective policy is determined based on a pair of regression models including a first regression model configured to estimate, based on the network state, a mean reward parameter and a mean cost parameter, and a second regression model configured to estimate, based on the network state, a deviation of reward parameter and a deviation of cost parameter. In at least some example embodiments, for at least one of the policies, the respective set of policy evaluation parameters for the respective policy is determined based on a neural network architecture. In at least some example embodiments, the neural network architecture is trained based on a stochastic gradient descent based method under a dataset including at least one of an experienced network state, an instantaneous reward, an instantaneous cost, or a next network state. In at least some example embodiments, the neural network architecture is configured to reduce or minimize differences between an estimated distribution of rewards and costs and a real distribution of rewards and costs. In at least some example embodiments, selecting the selected policy includes selecting, from a set of available policy selection functions based on a determination as to whether the cumulative cost satisfies a threshold, a selected policy selection function and selecting, based on analysis of each of the sets of policy evaluation parameters based on the selected policy selection function, the selected policy. In at least some example embodiments, the threshold includes a cost based on service level agreements (SLAs) of users of the communication network. In at least some example embodiments, based on a determination that the cumulative cost is less than or equal to the threshold, the selected policy selection function is configured to prevent selection of a high-reward high-cost policy. In at least some example embodiments, the selected policy selection function includes $H_i=(r_m-\alpha \cdot r_v)/(c_m+\alpha \cdot c_v)$, wherein $r_m$ is a mean reward, $r_v$ is a deviation of reward, $c_m$ is a mean cost, $c_v$ is a deviation of cost, and $\alpha$ is a parameter indicative of a risk tolerance. In at least some example embodiments, based on a determination that the cumulative cost is equal to or greater than the threshold, the selected policy selection function is configured to select a policy having a lowest expected cost. In at least some example embodiments, the selected policy selection function includes $G_i=c_m+\alpha \cdot c_v$, wherein $c_m$ is a mean cost, $c_v$ is a deviation of cost, and $\alpha$ is a parameter indicative of a risk tolerance. In at least some example embodiments, revising the resource management action to form the revised resource management action includes revising the resource management action, to form the revised resource management action, based on use of a neural network. In at least some example embodiments, the neural network is configured to minimize an objective that is based on violation function related to violation of an instantaneous constraint of the communication network. In at least some example embodiments, revising the resource management action to form the revised resource management action includes revising the resource management action, to form the revised resource management action, while reducing a possibility of violating an instantaneous constraint of the communication network and maintaining an expected instantaneous cost for resource management action. In at least some example embodiments, revising the resource management action to form the revised resource management action includes reducing at least one element of the resource management action based on a resource usage of the communication network. In at least some example embodiments, the method includes receiving, from the communication network based on the execution of the revised resource management action for the communication network, network state information and revise the machine learning based resource management policy based on the network state information.

In at least some example embodiments, an apparatus includes means for identifying, for a communication network, a set of policies including a rule-based resource management policy and a machine learning based resource management policy, means for determining, for each policy in the set of policies based on a network state of the communication network, a respective set of policy evaluation parameters indicative of a risk of applying the respective policy to the communication network, means for selecting, from the set of policies based on a cumulative cost of the communication network and the respective sets of policy evaluation parameters for the respective policies, a selected policy for performing resource management for the communication network, means for generating, based on the selected policy, a resource management action for the communication network, means for revising, based on the network state and a resource usage of the communication network, the resource management action to form a revised resource management action for the communication network, and means for initiating execution of the revised resource management action for the communication network. In at least some example embodiments, for at least one of the policies, the respective set of policy evaluation parameters for the respective policy includes at least one reward parameter and at least one cost parameter. In at least some example embodiments, the at least one reward parameter is indicative of a resource utilization within the communication network based on use of the respective policy for resource management, and the at least one cost is indicative an extent of violation of service level agreements based on use of the respective policy for resource management. In at least some example embodiments, the at least one reward parameter includes a mean of an expected cumulative reward based on use of the respective policy for resource management and a deviation of an expected cumulative reward based on use of the respective policy for resource management, and the at least one cost parameter includes a mean of an expected cumulative cost based on use of the respective policy for resource management and a deviation of an expected cumulative cost based on use of the respective policy for resource management. In at least some example embodiments, for at least one of the policies, the respective set of policy evaluation parameters for the respective policy is determined based on a pair of regression models including a first regression model configured to estimate, based on the network state, a mean reward parameter and a mean cost parameter, and a second regression model configured to estimate, based on the network state, a deviation of reward parameter and a deviation of cost parameter. In at least some example embodiments, for at least one of the policies, the respective set of policy evaluation parameters for the respective policy is determined based on a neural network architecture. In at least some example embodiments, the neural network architecture is trained based on a stochastic gradient descent based method under a dataset including at least one of an experienced network state, an instantaneous reward, an instantaneous cost, or a next network state. In at least some example embodiments, the neural network architecture is configured to reduce or minimize differences between an estimated distribution of rewards and costs and a real distribution of rewards and costs. In at least some example embodiments, the means for selecting the selected policy includes means for selecting, from a set of available policy selection functions based on a determination as to whether the cumulative cost satisfies a threshold, a selected policy selection function and means for selecting, based on analysis of each of the sets of policy evaluation parameters based on the selected policy selection function, the selected policy. In at least some example embodiments, the threshold includes a cost based on service level agreements (SLAs) of users of the communication network. In at least some example embodiments, based on a determination that the cumulative cost is less than or equal to the threshold, the selected policy selection function is configured to prevent selection of a high-reward high-cost policy. In at least some example embodiments, the selected policy selection function includes $H_i=(r_m-\alpha \cdot r_v)/(c_m+\alpha \cdot c_v)$, wherein $r_m$ is a mean reward, $r_v$ is a deviation of reward, $c_m$ is a mean cost, $c_v$ is a deviation of cost, and $\alpha$ is a parameter indicative of a risk tolerance. In at least some example embodiments, based on a determination that the cumulative cost is equal to or greater than the threshold, the selected policy selection function is configured to select a policy having a lowest expected cost. In at least some example embodiments, the selected policy selection function includes $G_i=c_m+\alpha\, c_v$, wherein $c_m$ is a mean cost, $c_v$ is a deviation of cost, and $\alpha$ is a parameter indicative of a risk tolerance. In at least some example embodiments, the means for revising the resource management action to form the revised resource management action includes means for revising the resource management action, to form the revised resource management action, based on use of a neural network. In at least some example embodiments, the neural network is configured to minimize an objective that is based on violation function related to violation of an instantaneous constraint of the communication network. In at least some example embodiments, the means for revising the resource management action to form the revised resource management action includes means for revising the resource management action, to form the revised resource management action, while reducing a possibility of violating an instantaneous constraint of the communication network and maintaining an expected instantaneous cost for resource management action. In at least some example embodiments, the means for revising the resource management action to form the revised resource management action includes means for reducing at least one element of the resource management action based on a resource usage of the communication network. In at least some example embodiments, the apparatus includes means for receiving, from the communication network based on the execution of the revised resource management action for the communication network, network state information and revise the machine learning based resource management policy based on the network state information.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Figure 1:
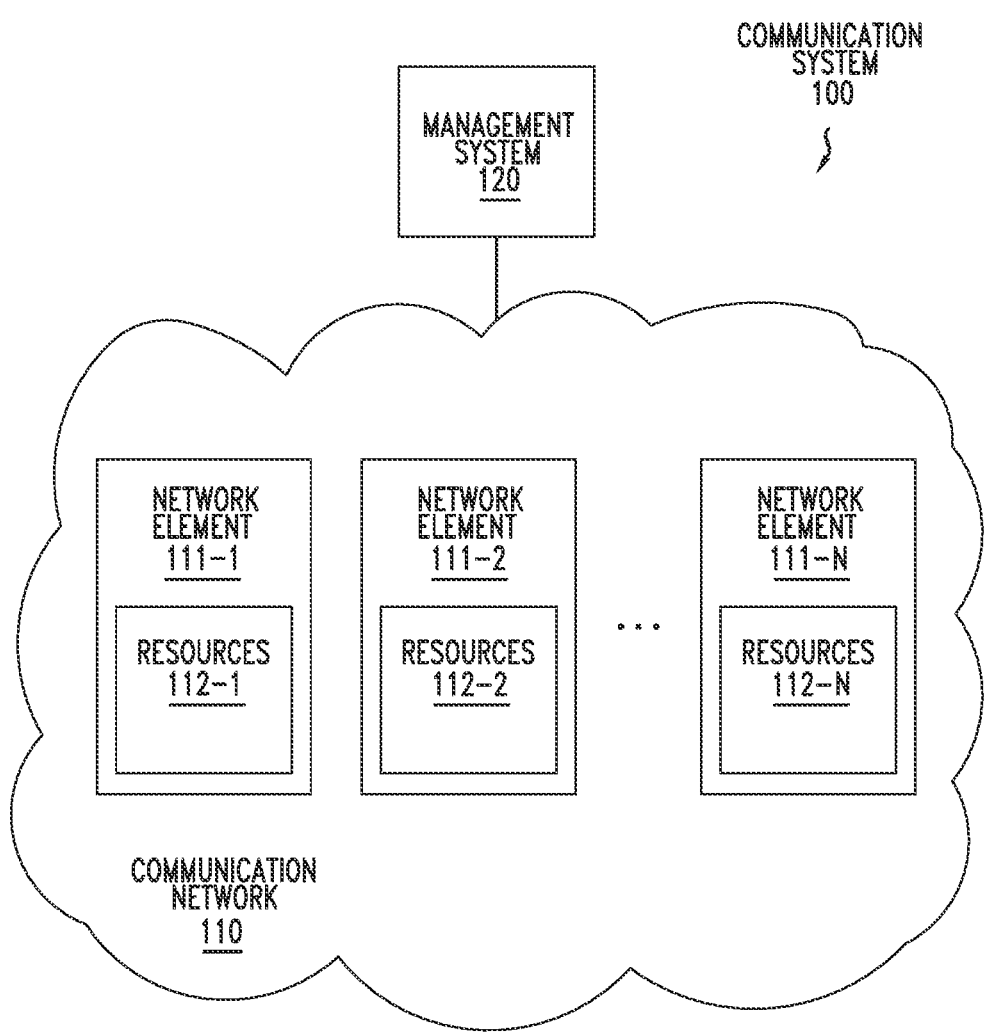
FIG. 1 depicts an example embodiment of a communication system including a communication network and a management system configured to perform management functions for the communication network.

Various example embodiments for supporting communication network management are presented. Various example embodiments for supporting communication network management may be configured to support communication network management for various types of management (e.g., resource management, service management, or the like, as well as various combinations thereof) which may be performed for various types of communication networks, such as wired communication networks (e.g., Internet Protocol (IP) networks, Ethernet networks, or the like), wireless communication networks (e.g., Third Generation (3G) wireless networks, Fourth Generation (4G) wireless networks, Long Term Evolution (LTE) networks, Fifth Generation (5G) networks, and so forth), or the like, as well as various combinations thereof.

Various example embodiments for supporting communication network management may be configured to support communication network management based on various network management policies. Various example embodiments for supporting communication network management may be configured to support communication network management based on various resource management policies. Various example embodiments for supporting communication network management may be configured to support communication network management based on various policies which may include one or more static rule-based policies (e.g., one or more rule-based resource management policies) and one or more machine learning (ML) based policies (e.g., one or more ML-based resource management policies). Various example embodiments for supporting communication network management may be configured to support communication network management based on evaluation and selection of policies to be applied for supporting communication network management. Various example embodiments for supporting communication network management may be configured to support communication network management based on regulation of network management actions generated based on selected policies before application of the network management actions to the communication network. Various example embodiments may be configured to dynamically switch between use of static rule-based resource management policies and use of ML-based resource management policies in a risk-controlled manner. It will be appreciated that at least some such functions may be configured to support use of ML-based resource management policies in communication networks while reducing or eliminating risks typically associated with use of ML-based resource management policies in communication networks (e.g., violation of service level agreements (SLAs) of customers, violation of network constraints of the communication network, and so forth).

Various example embodiments for supporting communication network management may be configured to support communication network management based on evaluation of the rule-based resource management policies and the ML-based resource management policies. Various example embodiments for dynamically switching between use of rule-based resource management policies and ML-based resource management policies may be configured to dynamically switch between use of rule-based resource management policies and ML-based resource management policies based on evaluation of the rule-based resource management policies and the ML-based resource management policies. The evaluation may be based on use of various metrics (e.g., rewards such as mean reward and deviation of reward, costs such as mean cost and deviation of cost, or the like, as well as various combinations thereof), functions (e.g., regression configured to generate various reward and cost metric values for the resource management policies, neural network architectures configured to generate various reward and cost metric values for the resource management policies, and so forth), or the like, as well as various combinations thereof.

Various example embodiments for supporting communication network management may be configured to support communication network management based on selection, based on results of evaluation of the rule-based resource management policies and the ML-based resource management policies, of a selected resource management policy to be applied to the network. Various example embodiments for dynamically switching between use of rule-based resource management policies and ML-based resource management policies may be configured to dynamically switch between use of rule-based resource management policies and ML-based resource management policies based on selection, based on results of evaluation of the rule-based resource management policies and the ML-based resource management policies, of a selected resource management policy to be applied to the network. The selection of the selected resource management policy (e.g., a rule-based resource management policy or an ML-based resource management policy) to be applied to the network may be based on use of various metrics, functions, or the like, as well as various combinations thereof. The selection of a resource management policy to be applied to the network may be based on use of various metrics (e.g., rewards such as mean reward and deviation of reward, costs such as mean cost and deviation of cost, or the like, as well as various combinations thereof), functions (e.g., functions configured to tend to select rule-based resource management policies under certain network conditions (e.g., when the risk of using an ML-based resource management policy for resource management in the network is deemed to be too high), functions configured to tend to select ML-based resource management policies under certain network conditions (e.g., when a risk of using an ML-based resource management policy for resource management in the network is deemed to be acceptable given the potential benefits, or rewards, of using the ML-based resource management policy for resource management in the network), and so forth), or the like, as well as various combinations thereof.

Various example embodiments for supporting communication network management may be configured to support communication network management based on use of action regulation to control and fine-tune resource management actions generated by the selected policy. Various example embodiments for dynamically switching between use of rule-based resource management policies and ML-based resource management policies may be configured to dynamically switch between use of rule-based resource management policies and ML-based resource management policies based on use of action regulation to control and fine-tune resource management actions generated by the selected policy (e.g., instantaneous constraints, long-term constraints, or the like, as well as various combinations thereof). The use of action regulation to control and fine-tune resource management actions generated by the selected policy may include determining whether an action generated based on the selected policy will violate any network constraints of the communication network, have an associated risk that network constraints of the communication network may or will be violated, and so forth.

It will be appreciated that various example embodiments for supporting communication network management based on various network management policies may be configured to reduce or eliminate risks associated with use of ML-based policies (e.g., execution of actions which may result in network conditions such as degradations and errors and, thus, which could negatively impact customers or lead to violation of SLAs of customers) while still permitting use of ML-based policies under various conditions, thereby enabling improved network management that results from use of ML-based policies, collection of feedback based on use of ML-based policies which may be used for further refinement of the ML-based policies, and so forth.

It will be appreciated that these and various other example embodiments and advantages or potential advantages of supporting communication network management may be further understood by way of reference to the various figures and the associated descriptions of the various figures.

As indicated above, network resource management becomes more and more complicated as the scale of mobile networks increases rapidly to meet the surging mobile traffic demands. Conventional approaches, e.g., static rule-based policies, cannot effectively handle the extremely large dimension of network state and resource management in terms of performance and intelligence. For example, a modern mobile network could deploy millions of distributed radio base stations, transport fiber links, and computer servers to serve hundreds of millions of people across the country. Network management needs to allocate various network resources, e.g., bandwidth and physical resource blocks (PRBs), and configure a huge number of equipment settings, e.g., scheduling priority and transmission mode selection, under high network dynamics, e.g., spatial and temporal traffic. Meanwhile, the wireless resource management should maintain the SLAs made with mobile users, which specify the minimum performance requirements when the mobile users connect to the network (e.g., minimum wireless data rate in both uplink and downlink transmission, the maximum network delay to reach public data networks (PDNs), or the like, as well as various combinations thereof).

Machine learning (ML) techniques have attracted extensive attention in solving difficult control and management problems, because of the capability of dealing with high-dimensional problems by leveraging advanced artificial neural network architectures. The ML techniques provide a model-free solution that requires no prior mathematical model of the network management. Through a large number of interactions with the mobile network, a massive amount of data is collected. The collected data is used to train neural network (NN) models, and a resource management policy can be derived, which could promise better network performance, e.g., throughput, delay, and utilization, than existing approaches.

Obtaining a resource management policy by using machine learning techniques typically requires a massive number of interactions with the real mobile network. In particular, the ML-based policy observes the network state of the mobile network, generates a resource management action to the network, and gets the rewards (system performances) accordingly. During the interactions, however, undesired resource management actions might be generated that could result in significant performance degradation, e.g., performance degradation in base station throughput, and violation of mobile user SLAs, e.g., violations of minimum data rate and maximum tolerable delay. This is mainly attributed to the unconstrained training exploration that randomly explores new resource management actions and unpredictable training exploitation which updates millions of parameters of the policy neural network with gradient-based descent methods. As a result, relying on a machine learning policy alone to manage mobile network generally cannot guarantee the SLAs of mobile users. Various example embodiments presented herein may be configured to enable risk-aware resource management solutions in mobile networks in a manner for lowering the risk that mobile user SLAs are violated when using machine learning techniques.

Various example embodiments may be configured to enable an online risk-aware resource management system with machine learning techniques in mobile networks. Various example embodiments may be configured to allow a network operator to understand the potential risks of violating SLAs of users and tenants, select the proper policy (e.g., either a static rule-based policy or an ML-based policy) to control the network to maintain SLAs of users and tenants (e.g., the long-term SLA(s)), generate a control action for the network based on the selected policy, and refine the control action to meet instant constraints in the network.

Various example embodiments may be configured to provide a module configured to evaluate the performance of different policies (e.g., rule-based policies and/or ML-based policies) in terms of long-term rewards and costs of controlling the network. This module may be based on a neural network architecture that is configured to, for resource management policies to be evaluated, take the network state as input and generate the estimated rewards and costs of users and tenants for the resource management policies.

Various example embodiments may be configured to provide a module configured to select the proper policy to control the network based on the estimated long-term performance. If the ML-based policy is not selected, a baseline policy may then take over the management of the mobile network for this time. The baseline policy may be derived from the existing rule-based policies that are operating in existing mobile network and which promise low risk of violation of SLAs in conjunction with resource management.

Various example embodiments may be configured to provide a module configured to refine the control actions generated by different policies to ensure that the instantaneous constraints of the mobile network can be met, e.g., resource capacity, power budget, or the like, as well as various combinations thereof.

Various example embodiments may be configured to use various combinations of the above-described modules to dynamically control network management, based on various policies including static rule-based policies and ML-based policies, while meeting the performance requirements of SLAs and ensuring that various network constraints continue to be met. This allows the ML-based policies to be applied to the network under certain conditions (e.g., when the risk of using ML-based policies on the network is determined to be relatively low, when the reward-cost ratio, or risk, associated with use of ML-based policies on the network is determined to satisfy a condition, and so forth), thereby enabling the network to benefit from use of ML-based policies for resource management while also enabling the ML-based policies to learn based on interaction with the real network such that the ML-based policies may be refined and improved over time (e.g., improving rewards (e.g., lower resource utilization), reducing costs, or the like, as well as various combinations thereof).

Various example embodiments may be configured to support one or more of a system and method to enable risk-aware resource management for mobile networks with online machine learning techniques, a risk evaluation module to estimate the risk of taking resource management actions to real mobile networks for different policy types including a baseline policy and a machine learning based policy (where the risk evaluation module may include one or more policy evaluation modules configured to evaluate one or more policy types for determining estimated reward and cost which may be used to quantify risk), a policy selection module to determine whether the baseline policy or the machine learning based policy is used in the network, an action regulation module that avoids explicit violation of instantaneous actions in the network, or various combinations thereof.

FIG. 1 depicts an example embodiment of a communication system including a communication network and a management system configured to perform management functions for the communication network.

The communication system 100 includes a communication network 110 that includes a set of network elements 111-1-111-N (collectively, network elements 111) supporting resources 112-1-112-N (collectively, resources 112), respectively. The communication system 100 also includes a management system 120 that is configured to provide management functions for the communication network 110.

The communication network 110 may be a wireline network (e.g., a Digital Subscriber Line (DSL) network, a cable network, a fiber optic network, or the like) based on various communications technologies (e.g., Ethernet, Internet Protocol (IP), Multiprotocol Label Switching (MPLS), or the like, as well as various combinations thereof), a wireless network (e.g., a Third Generation (3G) cellular network, a Fourth Generation (4G) cellular network, a 4G Long Term Evolution (LTE) cellular network, a Fifth Generation (5G) cellular network, a WiFi network, a wireless local area network (WLAN), or the like), or the like, as well as various combinations thereof. The network elements 111 may include various types of network elements which may be included in the communication network 110, which may depend on the network type of the communication network 110. For example, the network elements 111 may include access devices, routers, switches, gateways, dataplane elements, control plane elements, servers, or the like, as well as various combinations thereof. The resources 112 may include various types of resources which may be supported within the communication network 110 and managed by the management system 120, which may depend on the network type of the communication network 110. For example, the resources 112 may include processor resources, memory resources, session resources, bandwidth resources, access interface resources, air interface resources, physical resource blocks, or the like, as well as various combinations thereof. The communication network 110 is configured to support communications of various elements which are omitted for purposes of clarity, such as various communication endpoints. For example, such communication endpoints may include end user devices (e.g., smartphones, laptop computers, desktop computers, printers, smart televisions, gaming systems, or the like), Internet-of-Things (IoT) devices (e.g., sensors, actuators, appliances, thermostats, or the like), or the like, as well as various combinations thereof.

The management system 120 is configured to provide various management functions for the communication network 110 (e.g., network provisioning functions, network resource management functions, or the like, as well as various combinations thereof). The management system 120 may be configured to support network resource management in accordance with various example embodiments presented herein (e.g., based on use of static rule-based resource management policies and machine learning based resource management policies, based on risk-based evaluation of static rule-based resource management policies and machine learning based resource management policies for controlling which policy is used for network resource management for the communication network 110 at any given time, based on risk mitigation for supporting use of both static rule-based resource management policies and machine learning based resource management policies for network resource management for the communication network 110, or the like, as well as various combinations thereof). It will be appreciated that various functions supported by the management system 120 and communication network 110 for supporting network resource management in accordance with various example embodiments presented herein may be further understood by way of reference to FIGS. 2-9.

It will be appreciated that, although primarily presented with respect to specific communication networks having specific types, numbers, and arrangements of elements, various example embodiments presented herein may be used for management of various other types of communication networks, various example embodiments presented herein may be used for management of communication networks having other types, numbers, and/or arrangements of elements, or the like, as well as various combinations thereof.

Figure 2:
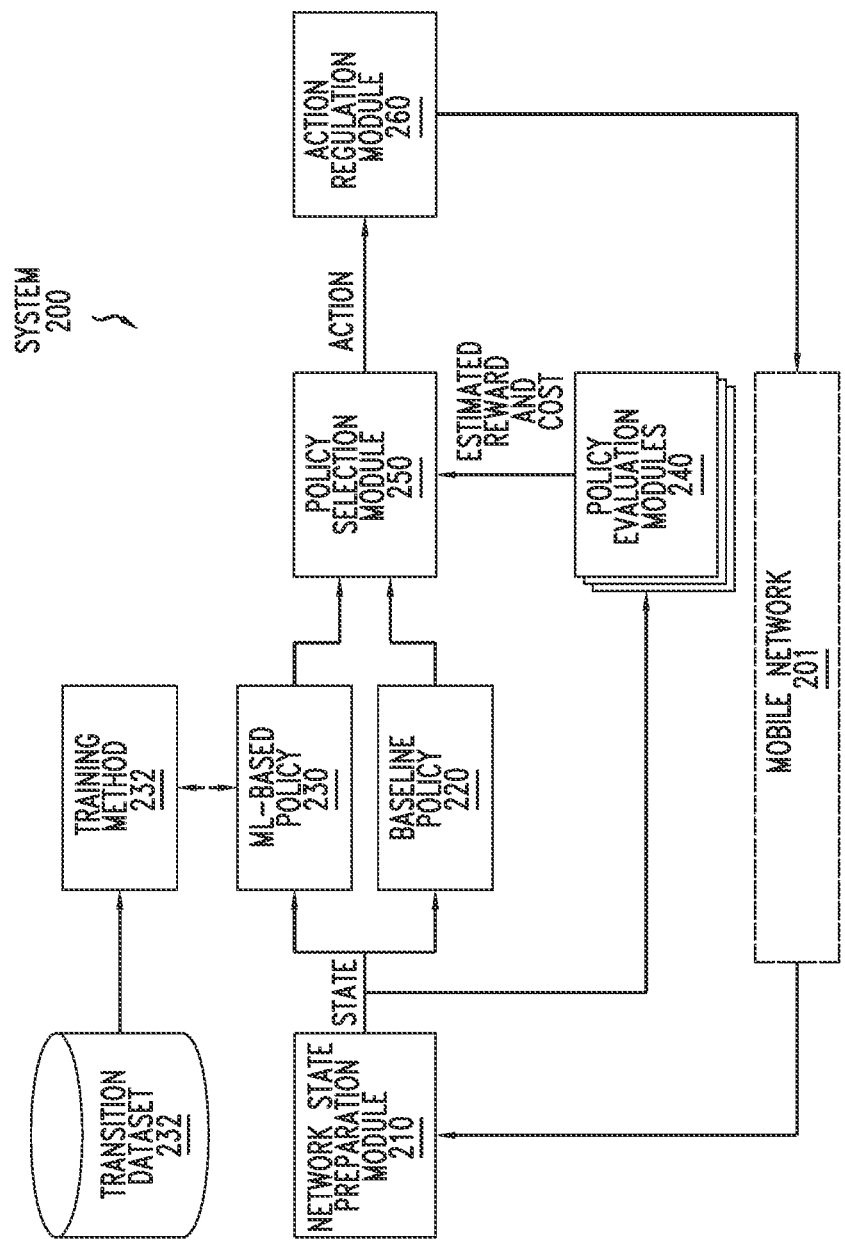
FIG. 2 depicts an example embodiment of a system architecture of a system configured to support network resource management for a mobile network.

FIG. 2 depicts an example embodiment of a system architecture of a system configured to support network resource management for a mobile network.

As depicted in FIG. 2, the system 200 includes a mobile network 201 and a number of other elements and information configured to support resource management for the mobile network 201, including a network state preparation module 210, a baseline policy 220, an ML-based policy 230, a training method 231, a transition dataset 232, policy evaluation modules 240, a policy selection module 250, and an action regulation module 260.

In at least some example embodiments, the general procedures of online resource management of mobile networks may be performed as follows.

1) At a configuration time, the mobile network 201 exposes a large amount of running status and metrics, e.g., data usage and delay of mobile users, and workload and resource usage of base stations. The network operator is able to retrieve these information to decide the next time slot configurations of the mobile network 201.
2) The network operator uses a policy to generate a resource management action according to this information. The policy could be a static rule-based policy, a cognitive function based policy, an ML-based policy, or the like. The action of the network operator could incorporate the resource allocation of wireless resources in the access network and computation resources in the core network.
3) The action is implemented into the mobile network 201 and some performance information can be obtained by the network operator, e.g., average resource utilization, average data rate of mobile users, average satisfaction ratio of slice tenants, and so forth.

Various example embodiments may be configured to evaluate resource management policies based on various perspectives, parameters, metrics, or the like, as well as various combinations thereof. For example, evaluation of a policy may be performed with respect to system performance (e.g., average resource utilization or the like) and violation of user SLA (e.g., minimum data rate or the like). As a result, the objective of the network operator could be multi-fold, e.g., minimizing the resource usage for supporting mobile users or network slices while maintaining their performance requirements defined by SLAs. In existing mobile networks, is it assumed that the network operator already has a baseline policy, e.g., static rule-based policy, which could obtain acceptable system performance and achieve a low risk of violating the SLAs for the mobile users.

Various example embodiments may be configured to support an online resource management system and that supports a safe online learning method for mobile network management. The system 200, as illustrated in FIG. 2, may be composed of components including some components that are configured to fulfill certain functionalities for supporting the system and method (e.g., network state preparation based on network state preparation module 210, baseline policy adoption for baseline policy 220, ML-based policy training for training the ML-based policy 230 based on the training method 231 using the transition dataset 232, and so forth) and some components that are configured to control how to manage such policies (including the rule-based polices and ML-based policies) for online resource management, e.g., risk estimation based on the policy evaluation modules 240, policy selection by the policy selection module 250 based on risk (e.g., based on estimated reward and cost information generated by the policy evaluation modules 240), action revision for risk avoidance or mitigation based on action regulation module 260, or the like, as well as various combinations thereof.

The network state preparation module 210 is configured to prepare the network state from the massive number of parameters in the mobile network 201 at a timeslot. The mobile network 201 could expose millions of metrics and status indicators, e.g., average throughput of base stations, utilization of network links, and workload of servers, from the physical layer to network layer, under a large-scale deployment of base stations, switches, and servers. These metrics may not be equal in terms of importance. For example, the transmission power of a base station may not contribute enough information when optimizing the delay performance of mobile users. The transmission delay of a single network switch for delivering the packets of a mobile user is less significant than the statistical delay in each network domain for this mobile user. When more parameters are exposed to the resource management policy, the processing time of these parameters is extended, and more complex policy design is needed for extracting useful information from these parameters. Hence, this network state preparation module 210 is used to pre-process this large number of network parameters and extract a concise representation of the state of the whole mobile network 201. This network state preparation module 210 can be completed by a statistical toolbox (e.g., moving averaging which outputs the average value of a moving window across the previous data streams and regression that regress the dataset with respect to given distributions) or other suitable mechanisms.

The baseline policy 220 may be provided by a baseline policy module. The baseline policy 220 may be adopted from the existing resource management policy of the network operator. The baseline policy 220 is configured to take the network state that is prepared from the network state preparation module 210 and generate a resource management action. The baseline policy 220 may be mainly based on static rules designed by human experience. For example, the scheduling priority of a mobile user in the Media Access Control (MAC) layer in the access network may be adjusted based on the historical throughput of the user in the last hour. A workload threshold can be set for evaluating the availability of a server when selecting the serving user plane function for a mobile user. These baseline policies could obtain acceptable system performance and achieve a low risk of violating the SLA of the mobile user. However, these baseline policies are static and cannot adapt to the complex network dynamics intelligently. Since these baseline policies are mainly derived based on the observation of a human under limited insights, there is a large space for improving the system performance with advanced machine learning techniques, which are capable of dealing with high-dimensional network resource management problems. The baseline policy 220, which also may be referred to herein as a static rule-based policy or more simply as a rule-based policy, may be denoted as $p_b$.

The ML-based policy 230 may be provided by an ML-based policy module. The ML-based policy 230 may be designed based on a neural network architecture with machine learning techniques. For example, a deep reinforcement learning (DRL) algorithm may be used to derive the ML-based policy, which aims to maximize the long-term rewards obtained from the network system. The ML-based policy 230 is configured to observe the network state organized by the network state preparation module 210 and generate a resource management action. The state space of the ML-based policy 230 may be defined as the state prepared by the network state preparation module 210, which could include the network traffic in different technical domains, e.g., resource usage of Radio Access Network (RAN) base stations, the channel condition of mobile users such as signal to noise ratio (SNR)/modulation coding scheme (MCS), the existing configuration of network infrastructures for example Software Defined Networking (SDN) switches and core network virtual network functions (VNF), and so forth. The action space of the ML-based policy 230 may be designed to control the network management of the mobile network 201. For example, the action space can be defined as wireless resource allocation, transport bandwidth and core network computing resources, and so forth. The ML-based policy 230 may be parameterized by millions of neural network parameters which may be optimized with a large number of training steps on transitions, e.g., network state, resource management action, system performance, network state, and so forth, at the next timeslot. With the advanced neural network architecture, the ML-based policy 230 can effectively deal with the high-dimensional resource management problem in large scale mobile networks. The ML-based policy 230 may be referred to herein as $p_m$.

The policy evaluation modules 240 may be configured to evaluate the performance and cost of policies.

The policy evaluation modules 240 may be configured to evaluate policies in a set of potential policies including one or more rule-based policies (e.g., baseline policy 220) and one or more ML-based policies (e.g., ML-based policy 230, and in various ways. The policy evaluation modules 240 may be configured to evaluate rule-based policies and an ML-based policies based on various parameters, functions, or the like, as well as various combinations thereof.

The inputs to the policy evaluation modules 240 may include the network state at the current configuration time slot, which is generated by the network state preparation module 210. The network state at the configuration time slot t is denoted as $s_t$.

The outputs from the policy evaluation modules 240 may include multiple estimated distributions regarding the performance and cost of a policy. Specifically, given the network state $s_t$, the policy evaluation modules 240 may generate $<r_m, r_v, c_m, c_v> = F(s_t)$, where a given policy evaluation module may be considered as a function denoted by F(•). Here, $r_m$ and $r_v$ are the mean and deviation of expected cumulative reward, respectively, which means the quantity of rewards expected to be obtained by this policy (e.g., from now to the end of resource management). Here, $c_m$ and $c_v$ are the mean and deviation of expected cumulative cost, respectively, which means the quantity of costs expected to be incurred by this policy (e.g., from now to the end of resource management). These estimated values may be used to determine whether the policy is good or bad in different perspectives.

The function that is provided by a policy evaluation module 240, the function F(•) that generates the estimation of performance and cost of a policy under the current network state $s_t$, may be implemented in various ways.

In at least some example embodiments, the function F(•) that generates the estimation of performance and cost of a policy under the current network state $s_t$ may be a regression model. For example, two mathematically regression models may be established (e.g., linear, polynomial or other nonlinear kernels, and so forth) and one of the regression models may be used to estimate the mean value of reward and cost, while the other regression model may be used to estimation the deviations of reward and cost. The regression model takes the network state $s_t$ as variables and updates by minimizing the mean square error (MSE) with a large dataset. This approach is suitable for a low-dimensional problem with high convergence rate.

Figure 3:
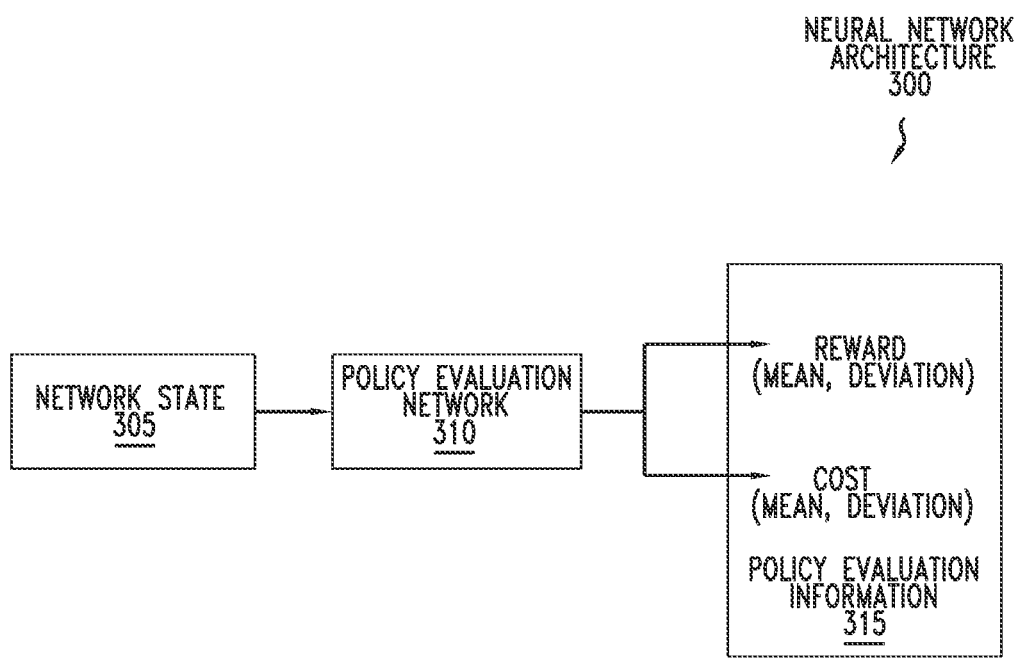
FIG. 3 depicts an example embodiment for evaluation of a resource management policy based on a neural network.

In at least some example embodiments, the function F(•) that generates the estimation of performance and cost of a policy under the current network state $s_t$ may be a neural network architecture. An example is illustrated in FIG. 3. As shown in FIG. 3, a neural network architecture 300 includes a policy evaluation network 310, in the form of a large neural network, that may be instantiated to accept network state 305 (e.g., network parameters, which may potentially include a huge number of parameters) as input and provide policy evaluation information 315 (e.g., mean reward and cost and deviation of reward and cost) as outputs (e.g., outputting the four values at the same time) as output. The policy evaluation network 310 may be trained with stochastic gradient descent (SGD) based methods under a large scale dataset. The dataset may include the experienced network states, instantaneous reward and cost, and the next network state. The objective of the training may be to minimize the differences between the estimated distribution and the real distribution of rewards and costs. This approach not only outputs the mean values of the reward and cost, but also outputs the deviations of the reward and cost, thereby providing more information for the policy selection module 250. This could prevent the policy selection module 250 from choosing the high-reward and high-cost policy (e.g., the ML-based policy 230 rather than the rule-based baseline policy 220), which could easily violate user SLA requirements.

The policy evaluation modules 240 may be configured to support various other functions for evaluating the performance and cost of policies.

The policy selection module 250 may be configured to select the policy that is used to control the resource management of the mobile network 201.

The policy selection module 250 may be configured to select the policy from a set of potential policies including one or more rule-based policies and one or more ML-based policies. The policy selection module 250 may be configured to select between use of a rule-based policy (e.g., baseline policy 220) and an ML-based policy (e.g., ML-based policy 230) under various conditions. The policy selection module 250 may be configured to prefer selection of an ML-based policy over a static rule-based policy under various conditions (e.g., where the reward/risk ratio associated with use of the ML-based policy is relatively low, where use of the ML-based policy is not expected to result in violation of user SLAs or violation of any network constraints, or the like, as well as various combinations thereof).

The policy selection module 250 may be configured to select the policy that is used to control the resource management of the mobile network 201 based on the current network states and cumulative costs of the mobile network 201.

The inputs to the policy selection module 250 may include the current network state $s_t$, cumulative costs until now, and the estimated rewards and costs generated by the policy evaluation modules 240.

The output of the policy selection module 250 may include the decision of the policy to be used for resource management for the mobile network 201.

The function that is provided by policy selection module 250 may be implemented in various ways.

In at least some example embodiments, the policy selection module 250 may be based on the following equation:

$$i^* = \begin{cases} \operatorname{argmax} H_i, \forall i & \sum_{k=0}^{t} c_k < C \\ \operatorname{argmin} G_i, \forall i, & \sum_{k=0}^{t} c_k > C \end{cases}$$

Here, the optimal policy, denoted as i*, is selected based on different functions depending on whether the cumulative cost until now exceeds a given cost threshold defined as C.

If the cumulative cost does not exceed the cost threshold (e.g., the SLA requirement defined by SLAs of users), the policy with the highest reward-cost-ratio in the following configuration time slots is selected. In other words, it is preferred that the selected policy have higher reward and lower cost. In this way, it is possible to achieve higher reward before the policy may violate the SLA requirements. In at least some example embodiments, the function $H_i$ may be defined as $H_i=(r_m-\alpha \cdot r_v)/(c_m+\alpha \cdot c_v)$, such that the deviation of reward is subtracted from the mean reward and the deviation of cost is added to the mean cost. This operation would prevent the selection of a policy with a high reward and a high cost, which would tend to violate the SLA requirements. It will be appreciated that the function $H_i$ may be defined, based on the mean reward and cost and the deviation of reward and cost, in other ways.

If the cumulative cost does exceed the cost threshold (e.g., the SLA requirements defined by SLAs of users), the policy with the lowest expected cost in the following configuration time slots is selected. In this way, it is possible to minimize the intensity of SLA violation when the SLA requirements have already been violated. In at least some example embodiments, the function $G_i$ may be defined as $G_i=c_m+\alpha \cdot c_v$, such that the deviation of cost is added to the mean cost for filtering any low-mean but high-deviation cost policies. It will be appreciated that the function $G_i$ may be defined, based on the mean cost and the deviation of cost, in other ways.

In at least some example embodiments, the positive parameter a may be used to fit the different risk preferences. For example, if $\alpha=0$, the deviation of rewards and costs are not considered when deciding the policy selection. In contrast, $\alpha=5$ means the deviations is much more important to select a policy, in other words, the network operator is not willing to risk SLA violation to have better rewards, e.g., low resource utilization.

It will be appreciated that, with the above-designed criteria, it becomes possible to select the policy to have better expected rewards while minimizing the chance of violation of SLA requirements.

The policy selection module 250 may be configured to support various other functions for selecting the policy from a set of potential policies including one or more rule-based policies and one or more ML-based policies.

The action regulation module 260 may be configured to fine-tune the resource management action generated by the policy selected to control the resource management of the mobile network 201. The action regulation module 260 may be configured to avoid violation of instantaneous action constraints in mobile networks. For example, the overall wireless resources in a base station is fixed and cannot be over-requested by all the connected mobile users as an over-requested resource demand could lead to unpredicted behaviors, e.g., mobile users scheduling and admission failures, system failure, and so forth.

The inputs to the action regulation module 260 may include the action $a_t$ generated by the selected policy, the current network state $s_t$, and the resource usage of the mobile network 201 in the last configuration time slot $u_{t-1}$.

The output from the action regulation module 260 may include the revised action, denoted as $\bar{a}_t$.

The function that is provided by the action regulation module 260 may be implemented in various ways. In at least some example embodiments, the action regulation module 260 may use a neural network to refine the generated action. The objectives of the action regulation module 260 may be multi-fold. For example, the objectives of the action regulation module 260 may include reducing or minimizing the chance of violating the instantaneous constraints of the network while maintaining the expected instantaneous cost for the action. To this end, it could be completed by reducing parts of actions according the resource usage of the network. However, directly revising the action could compromise the performance and the cost immediately, because the action generated by the policy has better reward and lower cost as discussed with respect to the policy selection module 250. Therefore, the neural network may be designed to minimize the objective $P_\Omega(a_t)+c_t$, where $P_\Omega(a_t)$ is the instant violation function if the action violates the instantaneous constraint of the network, e.g., resource capacity, power budget, and so forth. In particular, the network state may be needed for the action regulation module 260, because the instant cost function could be correlated to the network state, as well as the action. The neural network may be trained by minimizing the above objective with SGD-based methods.

The action regulation module 260 may be configured to support various other functions for supporting fine-tuning of the resource management action generated by the policy selected to control the resource management of the mobile network 201.

It will be appreciated, as indicated above, that the ML-based policy 230 may be trained based on the training method 231 using the transition dataset 232. The transition dataset 232 records all the interactions between the policies and the mobile network 201, e.g., network state, resource management action, system performance, and network state at the next timeslot. The information is used to update the neural network parameters and improve the ML-based policy 230. Meanwhile, the training methods 231 for the ML-based policy 230 can adopt existing algorithms, such as Proximal Policy Optimization (PPO) and Deep Deterministic Policy Gradient (DDPG). In other words, various example embodiments may be configured to embrace and further ML algorithms while maintaining safe online learning properties.

It will be appreciated that the system architecture of FIG. 2 may be adapted or modified in various ways while continuing to support network resource management for a mobile network.

It will be appreciated that the system architecture of FIG. 2, although primarily presented within the context of supporting network resource management for a mobile network, may be used or adapted for use to support network resource management for various other types of communication networks.

Various example embodiments presented herein may be configured to support online policy learning.

Various example embodiments presented herein may be configured to allow safe online policy learning by controlling the network management of a real network system.

Figure 4:
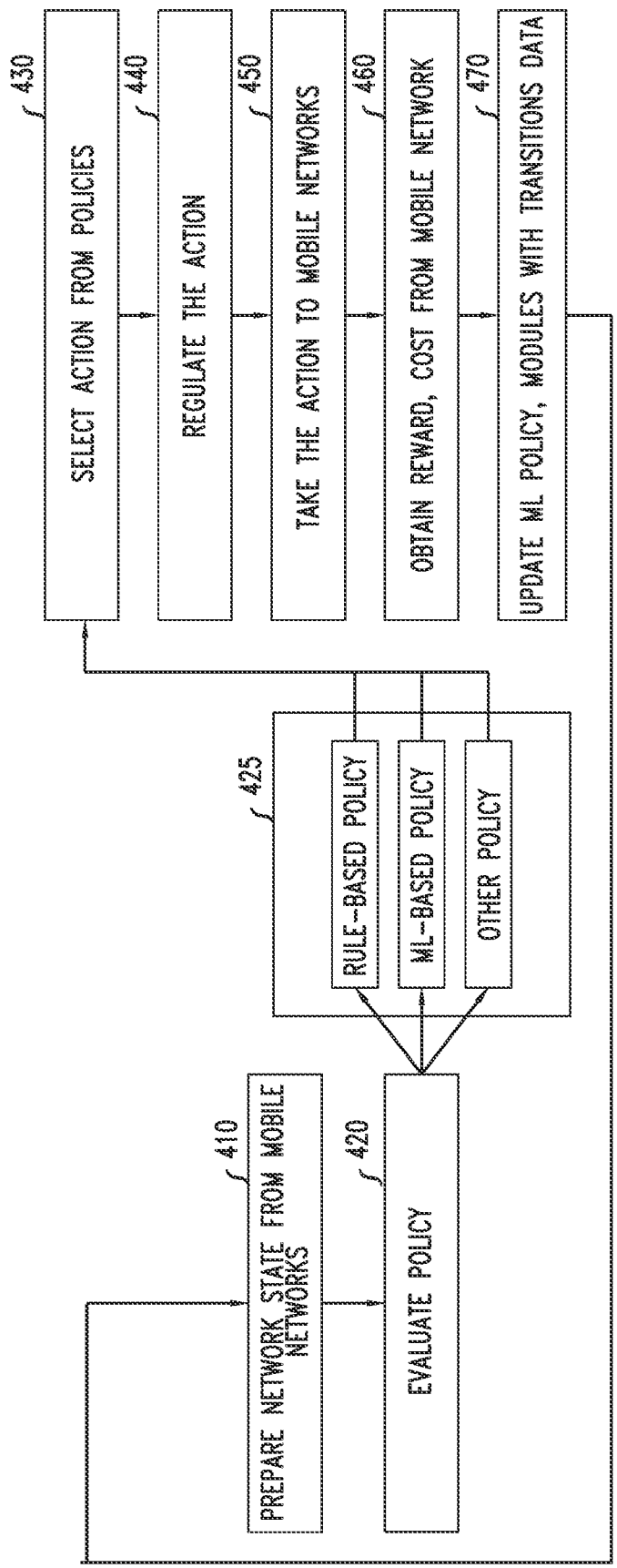
FIG. 4 depicts an example embodiment of a process for online policy learning in conjunction with resource management based on resource management policies.

FIG. 4 depicts an example embodiment of a process for online policy learning in conjunction with resource management based on resource management policies. As illustrated in FIG. 4, the process 400 for online policy learning may be accomplished with the following steps.

1. At block 410, the network state from the mobile networks is prepared. The network state may be extracted from the mobile networks by a network state preparation module.
2. At block 420, based on the current network states, the candidate policies are evaluated. As indicated by block 425, the candidate policies that are evaluated may include a rule-based policy, an ML-based policy, one or more other policies, and so forth. The candidate policies may be evaluated by a policy evaluation module. The statistical information of expected reward and cost are generated accordingly.
3. At block 430, a desired policy is selected from the candidate policies and an action is selected from the desired policy. The desired policy may be selected from the candidate policies by a policy selection module based on the proposed criteria, to have better rewards (e.g., low resource utilization) with less cost (e.g., low SLA violation). The action may be generated by, or based on, the selected policy under the current network state.
4. At block 440, the action is regulated. An action regulation module may revise the action, with the information of current network state and last network resource utilization, to minimize the instantaneous violation of network constraints.
5. At block 450, the revised action is taken to the real network system (e.g., to the mobile networks).
6. At block 460, the rewards and costs may be obtained from the mobile network. The rewards and costs may be fed back by the network system, after a period of time, e.g., one minute, two minutes, and so forth.
7. At block 470, various updates may be performed. The ML-based policy may be updated with the transition data according to the design of training algorithms. The ML-based policy may be revised based on network state information received from the communication network based on execution of a resource management action for the communication network (e.g., execution of an initial resource management action or execution of a revised resource management action). The policy evaluation module and action regulation module also may be updated with the new obtained transition, in order to adapt to varying network systems.

It will be appreciated that the above-described steps may be performed in other ways (e.g., at least some may be performed contemporaneously, in a different order than as presented, and so forth).

It will be appreciated that, by intelligently selecting different policies, e.g., rule-based policies and ML-based policies, various example embodiments presented herein may provide better system performances, e.g., high reward and low cost, for online resource management while also enabling the ML-based policy to be updated with the transition data collected by interacting with the real network system.

It will be appreciated that various other functions may be performed in support of online policy learning.

Various example embodiments presented herein may be configured to support offline policy learning.

Various example embodiments presented herein may be configured to support offline policy learning based on offline imitate learning.

Figure 5:
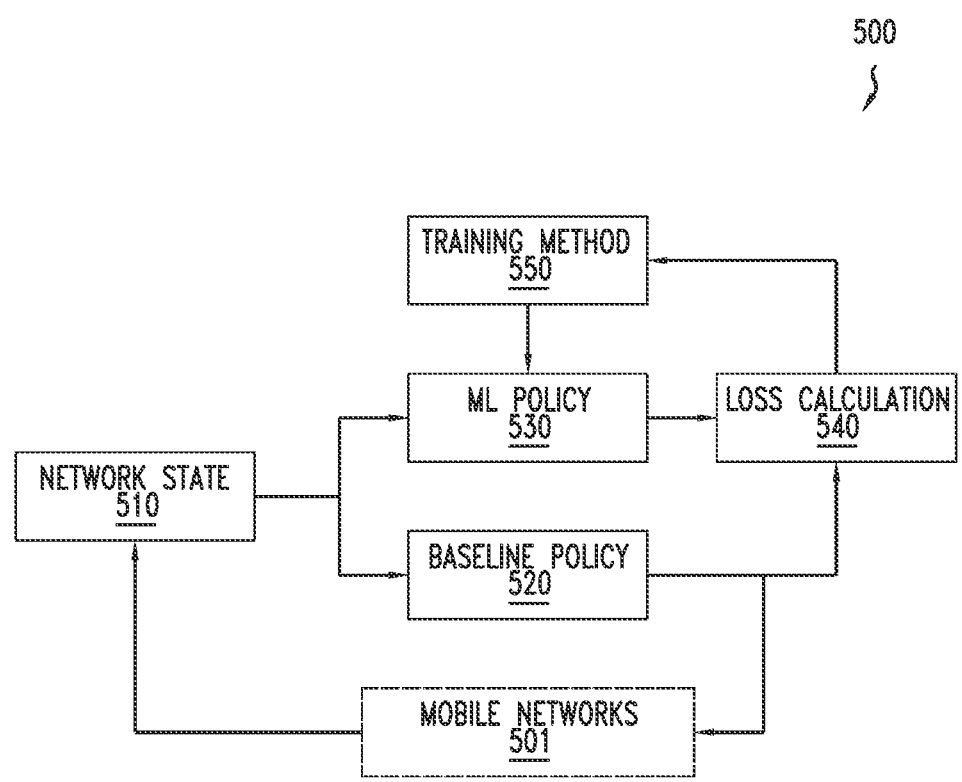
FIG. 5 depicts an example embodiment of a process for offline policy learning in conjunction with resource management based on resource management policies.

FIG. 5 depicts an example embodiment of a process for offline policy learning in conjunction with resource management based on resource management policies.

Considering that it is possible that the ML-based policy may not perform well at the very beginning since the ML-based policy is not well learned, imitate learning may be used to allow the ML-based policy to mimic the behavior of the rule-based baseline policy. It may be designed to imitate the baseline policy by using the ML-based policy without directly interacting with the real mobile networks. As depicted in FIG. 5, network state 510 is obtained from the mobile networks 501. The baseline policy 520 is used to manage the mobile networks 501 by getting the network state 510 from the network state preparation module and taking resource management actions based on the network state 510. At the same time, the ML-based policy 530 observes the network state 510 and generates action. A loss calculation 540 is performed based on the action taken by the baseline policy 520 and the action generated by the ML-based policy 530. The loss calculation 540 may include calculation of a loss function based on the Euclidian distance between the action taken by baseline policy 520 and the action generated by the ML-based policy 530. The neural network of the ML-based policy 530 is updated based on the loss function under a training method 550 (e.g., using gradient-based methods). After a large number of training steps, the ML-based policy 530 will generate very similar actions as compared to the baseline policy 520 under different network states. It will be appreciated that the transitions of the baseline policy (e.g., state, action, reward, and cost) may be collected to build the training dataset which may be used by a risk evaluation module (e.g., one or more policy evaluation modules) as, with the a large amount of real system data, the risk evaluation module may be trained to accurately predict the cumulative costs of any network state.

It will be appreciated that various other functions may be performed in support of offline policy learning.

Various example embodiments presented herein may be further understood by considering evaluation of various example embodiments based on a system prototype.

Figure 6:
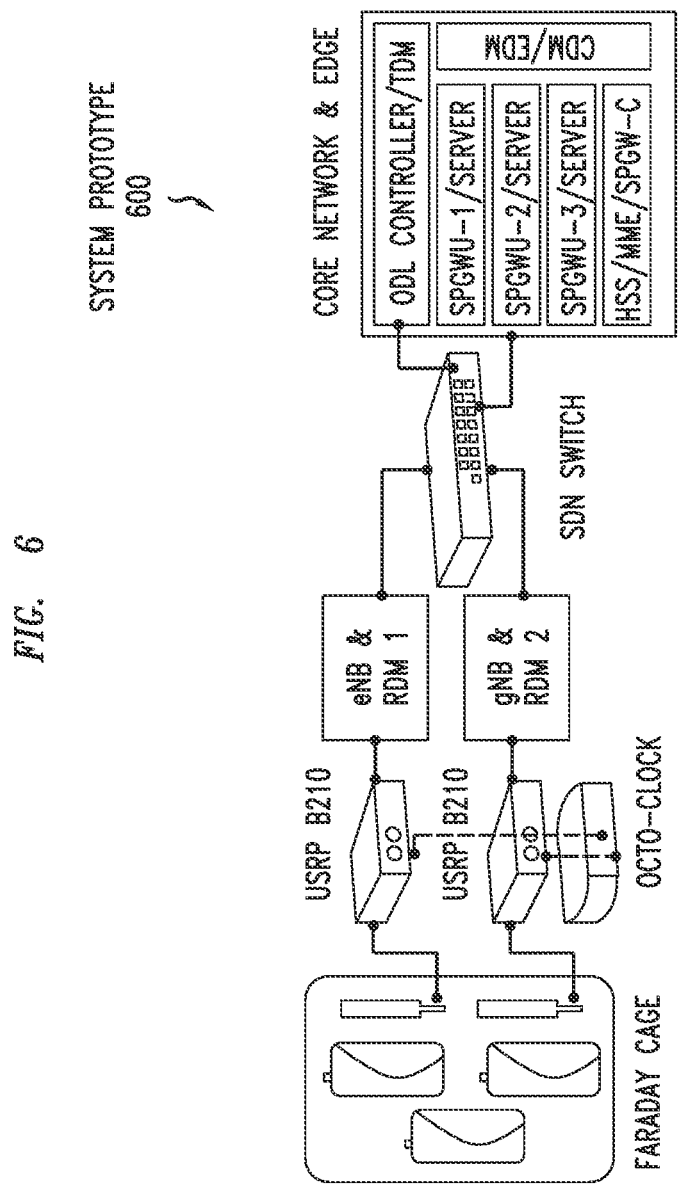
FIG. 6 depicts an example embodiment of a system prototype configured for use in evaluating various example embodiments for resource management.

FIG. 6 depicts an example embodiment of a system prototype configured for use in evaluating various example embodiments for resource management (at least some of which may be referred to herein as OnSlicing embodiments).

In FIG. 6, the system prototype 600 includes various elements configured to provide radio access network and core network functions, as well as various associated functions.

In the system prototype 600, the radio access network is developed based on the OpenAirInterface (OAI) project with FlexRAN support. The prototype uses two INTEL i7 computers with low-latency kernel of Ubuntu 18.04 as the evolved Node B (eNB) and next-generation Node B (gNB), and ETTUS Universal Software Radio Peripheral (USRP) B210 as the radio frequency (RF) front-end. The eNB and gNB operate at band 7 and band 78 with 20 MHz bandwidth, respectively. To eliminate external radio interference, a Faraday cage was used to contain both eNB and gNB antennas. An ETTUS Octo-clock is used to provide external 10 MHz reference signals for both the eNB and the gNB.

In the system prototype 600, three 5G smartphones are used. The 5G smartphones are POCO F2 Pros, with the support of both LTE and 5G non-standalone (NSA) Evolved Universal Mobile Telecommunications Service (UMTS) Terrestrial Radio Access Network (E-UTRAN) New Radio-Dual Connectivity (EN-DC) capabilities to emulate the traffic for three network slices, i.e., mobile augmented reality (MAR), high-definition video (HVS), and remote distance control (RDC).

In the system prototype 600, the transport network is based on the OpenDayLight (ODL) project with OpenFlow 1.30 support, including use of a RUCKUS ICX 7150-C12P switch as the SDN switch to connect the eNB/gNB and the core network, where each port has 1 Gbps bandwidth.

In the system prototype 600, the core domain manager (CDM) was based on the OpenAir-CN project. An INTEL i7 computer with 6 cores and Ubuntu 18.04 was used to host the virtualized network functions (VNFs) of the CN, e.g., home subscriber server (HSS), mobility management entity (MME), and combined Serving Gateway (SW) and Packet Data Network (PDN) Gateway (PGW) elements referred to as SPGWs (e.g., an SPGW control plane element (SPGW-C) and an SPGW user plane element (SPGW-U)). In particular, these VNFs are implemented with Docker container techniques.

In the system prototype 600, the edge domain manager (EDM) is provided within the core network computer. The edge servers for each individual slice are co-located in the corresponding SPGW-U containers.

In the system prototype 600, an orchestration agent was developed based on a proximal policy optimization (PPO) DRL algorithm with PyTorch 1.5. A 3-layer fully-connected neural network with ReLU activation functions, i.e., 128× 64×32, was used in all policy networks. The output activation functions of policy networks are Sigmoid to ensure the action is between 0 and 1.

The PPO agent may be designed as follows. More specifically, the state, action, reward, and cost elements of the PPO agent may be configured as follows.

The state is designed to reveal the comprehensive slice statistics and informative network status to the policy network. The state space may be defined to include the current time, the last traffic slice, the average channel condition of slice users, the average radio resource usage in RAN, the average workload of VNFs and edge server, the last slice performance and cost, the slice performance requirement, the cumulative cost at the current time, and so forth. In the state space, it provides the information about the expected traffic at the next time, offers the network status about resource utilization, shows the potential lasting impact from the last time, indicates the slice status about performance requirement, and so forth. The needed state information is retrieved from the interfaces in the OnSlicing virtualization for every configuration interval.

The action space is defined as the virtual resource allocations for each network slice, in the end-to-end domains. It includes the uplink virtual radio bandwidth, uplink MCS, and uplink scheduling algorithm, the downlink virtual radio bandwidth, downlink MCS, and downlink scheduling algorithm, the virtual transport bandwidth and reserved link in TN, the CPU and RAM allocation for co-located VNFs and edge servers, and so forth.

The reward is defined as the end-to-end resource utilization. The aim is to serve multiple end-to-end network slices with minimum resource utilization.

The cost is defined to evaluate the performance requirement of network slices. In other words, the cost is positive if the slice SLA is violated in the last configuration time slot.

Figure 7:
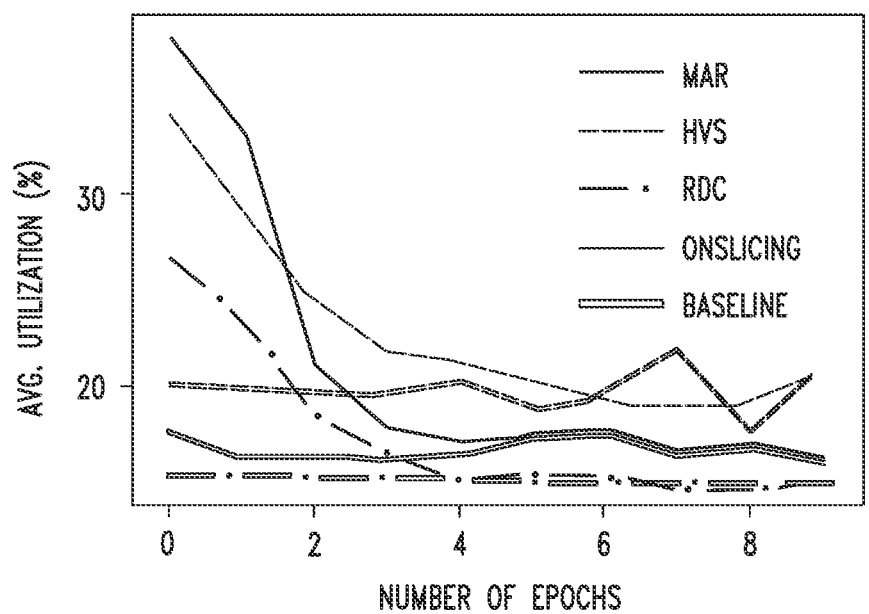
FIG. 7 depicts performance results for a network slice based on use of offline imitate learning for a machine learning based resource management policy.
Figure 8:
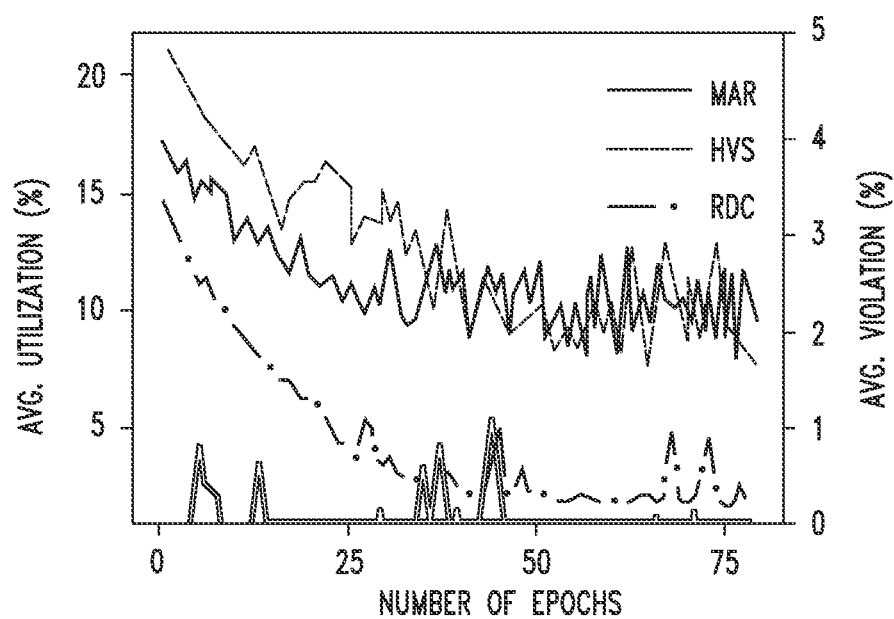
FIG. 8 depicts performance results for a network slice based on use of online learning for a machine learning based resource management policy.

The following discusses various results based on use of various example embodiments presented herein, including results for offline imitate learning (e.g., presented in FIG. 7) and results for online safe learning (e.g., presented in FIG. 8).

In offline imitate learning, the ML-based policy is trained offline to mimic the behavior of the baseline policy. For example, FIG. 7 illustrates the resource utilization of OnSlicing and baseline. It may be seen that the behavior of OnSlicing approximates the baseline policy as the number of offline training epochs increases. This validates the effectiveness of various example embodiments presented herein which support training of the ML-based policy.

In online safe learning, the ML-based policy updates its neural network by interacting with the real network system. With this safe learning mechanism, i.e., risk evaluation and policy switching, various example embodiments presented herein can achieve better performance than the baseline policy while maintaining minimum SLA violations. For example, in FIG. 8 it may be seen that various example embodiments presented herein reduce resource utilization more than 50% while averaging less than 0.05% SLA violations.

In at least some example embodiments, an apparatus, a computer-readable medium, and/or a method may be configured to determine, based on a network state of a communication network, a first set of policy evaluation parameters for a rule-based resource management policy and a second set of policy evaluation parameters for a machine learning based resource management policy, determine, based on a risk-based analysis of the first set of policy evaluation parameters and the second set of policy evaluation parameters, whether to select the rule-based resource management policy or the machine learning based resource management policy as a selected policy for the communication network, generate, based on the selected policy, a resource management action for the communication network, revise, based on the network state and a resource usage of the communication network, the resource management action for the communication network to form a revised resource management action for the communication network, and initiate execution of the revised resource management action for the communication network.

In at least some example embodiments, an apparatus, a computer-readable medium, and/or a method may be configured to determine, for a communication network, a network state of the communication network and a cumulative cost associated with the communication network, identify a set of policies including at least a rule-based resource management policy and a machine learning based resource management policy, determine, for each policy in the set of policies based on the network state, a respective policy evaluation for the respective policy that includes a respective set of evaluation parameters indicative of a risk of applying the respective policy to the communication network, wherein the respective sets of evaluation parameters for the respective policies include a mean reward parameter, a deviation of reward parameter, a mean cost parameter, and a deviation of cost parameter, and select, from the set of policies based on the respective sets of policy evaluation parameters for the policies, a selected policy for performing resource management for the communication network.

In at least some example embodiments, an apparatus, a computer-readable medium, and/or a method may be configured to determine, for each policy in a set of policies including a rule-based resource management policy and a machine learning based resource management policy, a respective policy evaluation including a set of evaluation parameters indicative of a risk of applying the respective policy to a communication network and select, from the set of policies based on analysis of the respective policy evaluations for the policies based on use of a risk analysis function selected from a set of risk analysis functions based on a cumulative cost of the communication network, a selected policy for performing resource management for the communication network.

In at least some example embodiments, an apparatus, a computer-readable medium, and/or a method may be configured to generate, based on a machine learning based resource management policy, a resource management action for a communication network, revise, using a neural network and based on a network state of the communication network and a resource usage of the communication network, the resource management action to form a revised resource management action for the communication network, wherein the neural network is configured to reduce a possibility of violating a constraint of the network based on the resource management action and to maintain an expected instantaneous cost for the resource management action, and initiate execution of the revised resource management action for the communication network.

In at least some example embodiments, an apparatus, a computer-readable medium, and/or a method may be configured to generate, based on a machine learning based resource management policy, a resource management action for a communication network, revise, based on a network state of the communication network and a resource usage of the communication network, the resource management action to form a revised resource management action for the communication network, initiate execution of the revised resource management action for the communication network, receive, from the communication network based on the execution of the revised resource management action for the communication network, network state information of the communication network, and modify, based on the network state information of the communication network, the machine learning based resource management policy.

Figure 9:
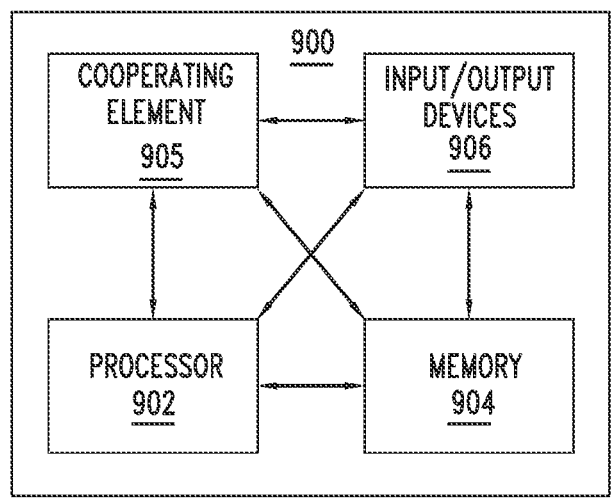
FIG. 9 depicts an example embodiment of a computer suitable for use in performing various functions presented herein.

FIG. 9 depicts an example embodiment of a computer suitable for use in performing various functions presented herein.

The computer 900 includes a processor 902 (e.g., a central processing unit (CPU), a processor, a processor having a set of processor cores, a processor core of a processor, or the like) and a memory 904 (e.g., a random access memory, a read only memory, or the like). The processor 902 and the memory 904 may be communicatively connected. In at least some example embodiments, the computer 900 may include at least one processor and at least one memory including computer program code, wherein the at least one memory and the computer program code are configured to, with the at least one processor, cause the computer to perform various functions presented herein.

The computer 900 also may include a cooperating element 905. The cooperating element 905 may be a hardware device. The cooperating element 905 may be a process that can be loaded into the memory 904 and executed by the processor 902 to implement various functions presented herein (in which case, for example, the cooperating element 905 (including associated data structures) can be stored on a non-transitory computer-readable storage medium, such as a storage device or other suitable type of storage element (e.g., a magnetic drive, an optical drive, or the like)).

The computer 900 also may include one or more input/output devices 906. The input/output devices 906 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 900 may represent a general architecture and functionality suitable for implementing functional elements described herein, portions of functional elements described herein, or the like, as well as various combinations thereof. For example, computer 900 may provide a general architecture and functionality that is suitable for implementing one or more elements presented herein, such as a network element 111 or a portion thereof, the management system 120 or a portion thereof, a network state preparation module or a portion thereof, a risk evaluation module or a portion thereof, a policy evaluation module or a portion thereof, a policy selection module or a portion thereof, an action regulation module or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory including instructions which, when executed by the at least one processor, cause the apparatus at least to perform:
identifying, for a communication network, a set of policies including a rule-based resource management policy and a machine learning based resource management policy;
determining, for each policy in the set of policies based on a network state of the communication network, a respective set of policy evaluation parameters indicative of a risk of applying the respective policy to the communication network;
selecting, from the set of policies based on a cumulative cost of the communication network and the respective sets of policy evaluation parameters for the respective policies, a selected policy for performing resource management for the communication network, wherein selecting the selected policy comprises:
selecting, from a set of available policy selection functions based on a determination as to whether the cumulative cost satisfies a threshold, a selected policy selection function; and
selecting, based on analysis of each of the sets of policy evaluation parameters based on the selected policy selection function, the selected policy;
generating, based on the selected policy, a resource management action for the communication network;
revising, based on the network state and a resource usage of the communication network, the resource management action to form a revised resource management action for the communication network; and
initiating execution of the revised resource management action for the communication network.

2. The apparatus of claim 1, wherein, for at least one of the policies, the respective set of policy evaluation parameters for the respective policy includes at least one reward parameter and at least one cost parameter.

3. The apparatus of claim 2, wherein the at least one reward parameter is indicative of a resource utilization within the communication network based on use of the respective policy for resource management, wherein the at least one cost parameter is indicative an extent of violation of service level agreements based on use of the respective policy for resource management.

4. The apparatus of claim 2, wherein the at least one reward parameter includes a mean of an expected cumulative reward based on use of the respective policy for resource management and a deviation of an expected cumulative reward based on use of the respective policy for resource management, wherein the at least one cost parameter includes a mean of an expected cumulative cost based on use of the respective policy for resource management and a deviation of an expected cumulative cost based on use of the respective policy for resource management.

5. The apparatus of claim 1, wherein, for at least one of the policies, the respective set of policy evaluation parameters for the respective policy is determined based on a pair of regression models including:

a first regression model configured to estimate, based on the network state, a mean reward parameter and a mean cost parameter; and a second regression model configured to estimate, based on the network state, a deviation of reward parameter and a deviation of cost parameter.

6. The apparatus of claim 1, wherein, for at least one of the policies, the respective set of policy evaluation parameters for the respective policy is determined based on a neural network architecture.

7. The apparatus of claim 6, wherein the neural network architecture is trained based on a stochastic gradient descent based method under a dataset including at least one of an experienced network state, an instantaneous reward, an instantaneous cost, or a next network state.

8. The apparatus of claim 6, wherein the neural network architecture is configured to reduce or minimize differences between an estimated distribution of rewards and costs and a real distribution of rewards and costs.

9. The apparatus of claim 1, wherein the threshold includes a cost based on service level agreements (SLAs) of users of the communication network.

10. The apparatus of claim 1, wherein, based on a determination that the cumulative cost is less than or equal to the threshold, the selected policy selection function is configured to prevent selection of a high-reward high-cost policy.

11. The apparatus of claim 10, wherein the selected policy selection function is $H_i=(r_{in}-\alpha \cdot r_v)/(c_{in}+\alpha \cdot c_v)$, wherein $H_i$ is the reward-cost ratio of policy i, $r_m$ is a mean reward, $r_v$ is a deviation of reward, $c_m$ is a mean cost, $c_v$ is a deviation of cost, and $\alpha$ is a parameter indicative of a risk tolerance.

12. The apparatus of claim 1, wherein, based on a determination that the cumulative cost is equal to or greater than the threshold, the selected policy selection function is configured to select a policy having a lowest expected cost.

13. The apparatus of claim 12, wherein the selected policy selection function is $G_i=c_{in}+\alpha \cdot c_v$, wherein $G_i$ is the expected cost of policy i, $c_m$ is a mean cost, $c_v$ is a deviation of cost, and $\alpha$ is a parameter indicative of a risk tolerance.

14. The apparatus of claim 1, wherein revising the resource management action to form the revised resource management action comprises:

revising the resource management action, to form the revised resource management action, based on use of a neural network.

15. The apparatus of claim 14, wherein the neural network is configured to minimize an objective that is based on violation function related to violation of an instantaneous constraint of the communication network.

16. The apparatus of claim 1, wherein revising the resource management action to form the revised resource management action comprises:

revising the resource management action, to form the revised resource management action, while reducing a possibility of violating an instantaneous constraint of the communication network and maintaining an expected instantaneous cost for the resource management action.

17. The apparatus of claim 1, wherein revising the resource management action to form the revised resource management action comprises:

reducing at least one element of the resource management action based on a resource usage of the communication network.

18. A non-transitory computer-readable medium storing computer program code which, when executed by an apparatus, causes the apparatus at least to perform:

identifying, for a communication network, a set of policies including a rule-based resource management policy and a machine learning based resource management policy;

determining, for each policy in the set of policies based on a network state of the communication network, a respective set of policy evaluation parameters indicative of a risk of applying the respective policy to the communication network;

selecting, from the set of policies based on a cumulative cost of the communication network and the respective sets of policy evaluation parameters for the respective policies, a selected policy for performing resource management for the communication network, wherein selecting the selected policy comprises:

selecting, from a set of available policy selection functions based on a determination as to whether the cumulative cost satisfies a threshold, a selected policy selection function; and selecting, based on analysis of each of the sets of policy evaluation parameters based on the selected policy selection function, the selected policy;

generating, based on the selected policy, a resource management action for the communication network;

revising, based on the network state and a resource usage of the communication network, the resource management action to form a revised resource management action for the communication network; and initiating execution of the revised resource management action for the communication network.

19. A method, comprising:

identifying, for a communication network, a set of policies including a rule-based resource management policy and a machine learning based resource management policy;

determining, for each policy in the set of policies based on a network state of the communication network, a respective set of policy evaluation parameters indicative of a risk of applying the respective policy to the communication network;

selecting, from the set of policies based on a cumulative cost of the communication network and the respective sets of policy evaluation parameters for the respective policies, a selected policy for performing resource management for the communication network, wherein selecting the selected policy comprises:

selecting, from a set of available policy selection functions based on a determination as to whether the cumulative cost satisfies a threshold, a selected policy selection function; and selecting, based on analysis of each of the sets of policy evaluation parameters based on the selected policy selection function, the selected policy;

generating, based on the selected policy, a resource management action for the communication network;

revising, based on the network state and a resource usage of the communication network, the resource management action to form a revised resource management action for the communication network; and initiating execution of the revised resource management action for the communication network.

* * * * *

UNITED STATES PATENT AND TRADEMARK OFFICE
CERTIFICATE OF CORRECTION

| | | |
|---|---|---|
| PATENT NO. | : 12,255,781 B2 | Page 1 of 1 |
| APPLICATION NO. | : 17/692275 | |
| DATED | : March 18, 2025 | |
| INVENTOR(S) | : Qiang Liu and Nak Jung Choi | |

It is certified that error appears in the above-identified patent and that said Letters Patent is hereby corrected as shown below:

In the Claims

In Column 27, Line 29, Claim 11, delete "$H_i=(r_{in}-\alpha \cdot r_v)/(c_{in}+\alpha \cdot c_v)$," and insert -- $H_i=(r_m-\alpha \cdot r_v)/(c_m+\alpha \cdot c_v)$, --.

In Column 27, Line 38, Claim 13, delete "$G_i=c_{in}+\alpha \cdot c_v$," and insert -- $G_i=c_m+\alpha \cdot c_v$, --.

Signed and Sealed this
Twenty-ninth Day of April, 2025

Coke Morgan Stewart
*Acting Director of the United States Patent and Trademark Office*